(12) United States Patent
Liew

(10) Patent No.: US 8,070,131 B2
(45) Date of Patent: Dec. 6, 2011

(54) RECESSED CUTTING EDGE FOR WIRE CUTTING GATE VALVES

(75) Inventor: Joseph S. Y. Liew, Tower A (SG)

(73) Assignee: Vetco Gray Inc., Houston, TX (US)

( * ) Notice: Subject to any disclaimer, the term of this patent is extended or adjusted under 35 U.S.C. 154(b) by 456 days.

(21) Appl. No.: 12/258,927

(22) Filed: Oct. 27, 2008

(65) Prior Publication Data

US 2010/0102263 A1 Apr. 29, 2010

(51) Int. Cl.
*F16K 3/30* (2006.01)

(52) U.S. Cl. ......................... 251/326; 166/361

(58) Field of Classification Search .......... 251/326–329; 166/361
See application file for complete search history.

(56) References Cited

U.S. PATENT DOCUMENTS

| | | | | |
|---|---|---|---|---|
| 4,132,267 A | * | 1/1979 | Jones | 166/55 |
| 4,215,749 A | * | 8/1980 | Dare et al. | 166/361 |
| 4,671,312 A | * | 6/1987 | Bruton | 137/315.29 |
| 4,911,410 A | * | 3/1990 | Baker | 251/327 |
| 4,987,956 A | * | 1/1991 | Hansen et al. | 166/361 |
| 4,997,162 A | * | 3/1991 | Baker et al. | 251/327 |
| 5,370,362 A | | 12/1994 | Kent et al. | |
| 5,501,424 A | * | 3/1996 | Williams et al. | 251/1.3 |
| 5,803,431 A | * | 9/1998 | Hoang et al. | 251/327 |
| 6,454,015 B1 | | 9/2002 | Armstrong et al. | |
| 6,601,650 B2 | * | 8/2003 | Sundararajan | 166/361 |

FOREIGN PATENT DOCUMENTS

| | | |
|---|---|---|
| GB | 2282869 A | 4/1995 |
| GB | 2352494 B | 4/2003 |

OTHER PUBLICATIONS

Search Report, Application No. GB0918262.7, dated Nov. 13, 2009.

* cited by examiner

*Primary Examiner* — John Bastianelli
(74) *Attorney, Agent, or Firm* — Bracewell & Giuliani LLP

(57) ABSTRACT

A gate valve having a body, a chamber housed in the body, a passage through the body that intersects the chamber, a gate for selectively opening and closing the valve, and a cutting edge on the gate. The cutting edge can sever any lines that may be in the valve and still seal after closing. The gate includes a recess formed to collect cuttings formed while severing the line.

17 Claims, 5 Drawing Sheets

RECESSED CUTTING EDGE FOR WIRE CUTTING GATE VALVES

FIELD OF THE INVENTION

This invention relates in general to gate valves, and in particular to an improved gate and valve face contoured to shear a line and maintain a seal across the valve after shearing.

BACKGROUND OF THE INVENTION

During oil and gas production, wirelines are often lowered through some type of gate valve. Ideally, the wireline is removed from the well before the gate valve is closed. However, in some situations wireline removal prior to valve closure is not possible and the gate valve is closed on the wireline. Gate valves having wireline therethrough should be capable of shearing the wireline while closing and maintain a seal after the valve is seated. Accordingly, the gate valve sealing surfaces should be durable and able to withstand repeated cycling; this is especially true for gate valves used in the oil and gas industry. Since the valves are opened and closed often and usually under severe operating conditions, the durability of the sealing surfaces is important to avoid leakage and the necessity of having to frequently perform maintenance on the valves.

Typical wireline shearing gate valves require a hard brittle inlay, such as Stellite®, on the valve seating surface. The inlay provides a substrate with a high strength cutting edge. Valve materials are generally coated to improve valve durability. However, care must be taken when applying the hard inlay to avoid damaging the valve material coating. Inlay materials are generally not as durable as gate valve materials and can be easily scratched or damaged, thereby reducing sealing capacity.

SUMMARY OF THE INVENTION

Disclosed herein is a gate valve assembly having a valve body, a chamber in the body, and a passage formed through the body that intersects the chamber. The valve also includes a gate with first and second planar sides, an opening or bore is formed through the member between the sides. The gate can be moved within the chamber to selectively align the opening with the passage for flow through the valve. The gate includes a recess formed on the first side of the gate at the opening and a cutting edge adjacent the recess and recessed within the opening. The recess may be a flat surface parallel with the first side and located within the opening. A cutting member may optionally be included that is recessed within the opening and protrudes therein. The cutting edge may be defined by a line where two surfaces are joined, where the angle between the two surfaces is about 90°. Alternatively, the cutting edge may be defined by a line where two surfaces are joined, where the angle between the two surfaces is about 45°. The recess may extend around only a fractional portion of the circumference of the opening. The valve can also include an annular valve seat coaxially provided in the passage.

DETAILED DESCRIPTION OF THE INVENTION

Figure 1:
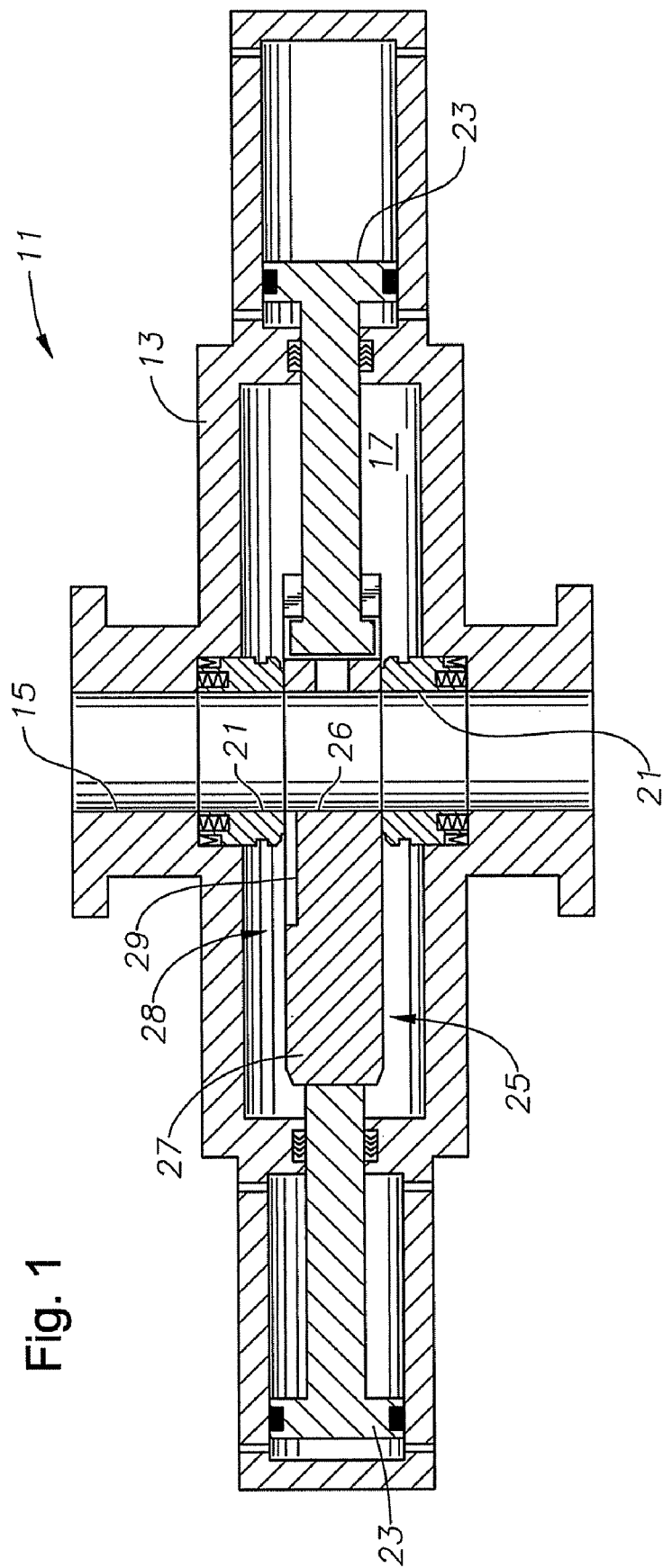
FIG. 1 is a sectional view a gate valve assembly having a gate in accordance with the present disclosure.

FIG. 1 provides a side sectional view of an embodiment of a gate valve 11. The gate valve comprises a body 13 housing a chamber 17 therein and a passage 15 formed through the body 13 that intersects the chamber 17. A gate 25 is shown within the chamber 17 that is a generally planar member having a solid portion 27 and an opening 26 formed through the solid portion 27. The gate 25 is selectively slidable within the chamber 17. Annular valve seats 21 are shown co-axially disposed in the passage 15, each having an end extending into the chamber 17. In the embodiment of the valve assembly 11 shown in FIG. 1, the opening 26 is registered with the passage 15, thereby placing the valve assembly 11 in the open position, allowing flow through the passage 15.

Figure 6:
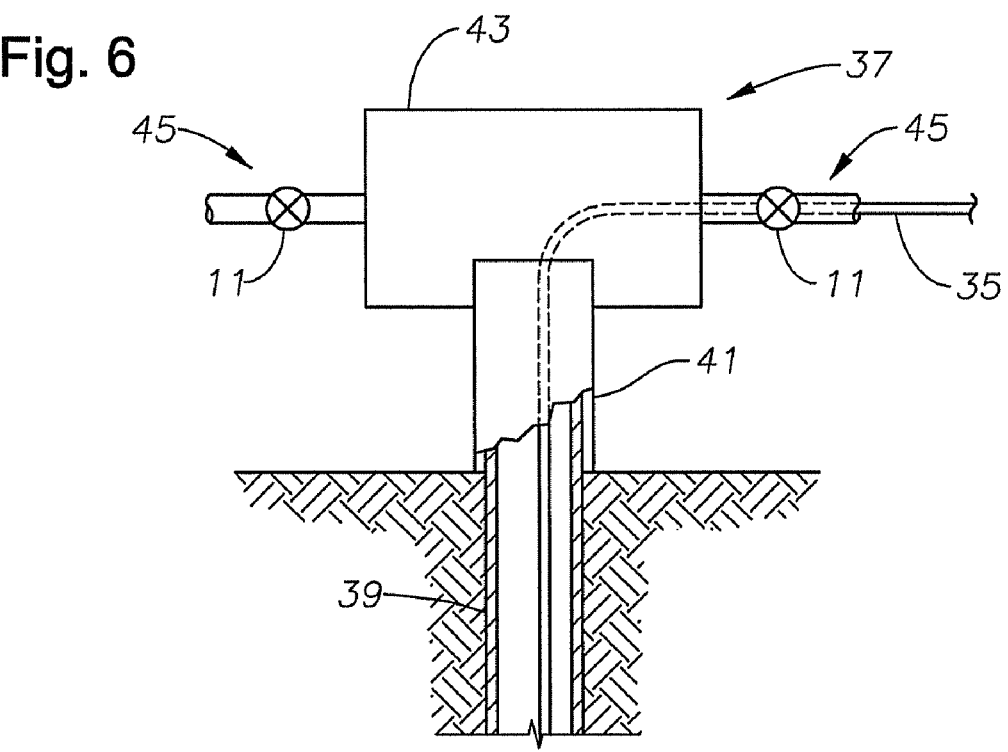
FIG. 6 is a schematic of a wellhead assembly having a gate valve assembly as described herein.

While in the open position the valve seats 21 sealingly contact the solid portion along an annular surface that circumscribes the opening 26. The sealing contact provides a pressure seal between the chamber 17 and passage 15. The gate 25 is selectively movable within the chamber 17 such as by pistons 23 disposed on connecting rod ends attached to opposing ends of the gate 25. Pressurizing either end of the pistons 23 provides a resulting force to selectively move the gate 25 within the valve assembly 11. The gate 25 can be moved to put the valve assembly 11 into the open position illustrated in FIG. 1, or in a closed position as shown in FIG. 6. Other means for sliding the gate 25 through the chamber 17 include a valve handle, motor means, and a gearing attachment.

Referring still to FIG. 1, a valve face 28 defines a side of the gate 25 having the opening 26. A recess 29 is shown on the valve face 28 extending from the opening 26 and along a length of the solid portion 27 on the valve face 28. When the valve 11 is in the closed position, the valve seat 21 will be in sealing engagement with the valve face 28 and the recess 29 will be outside of the valve seat 21 circumference. Optionally, the recess 29 may extend along a segment of the solid portion 27. When the valve 11 is closed, a truncated recess 29 could allow the seal ring to remain in sealing engagement with the valve face 28 with the recess 29 inside of the seal ring circumference. Contacting the gate sealing surface with the seat prevents excessive ingress and foreign matter from entering the valve.

Figure 2:
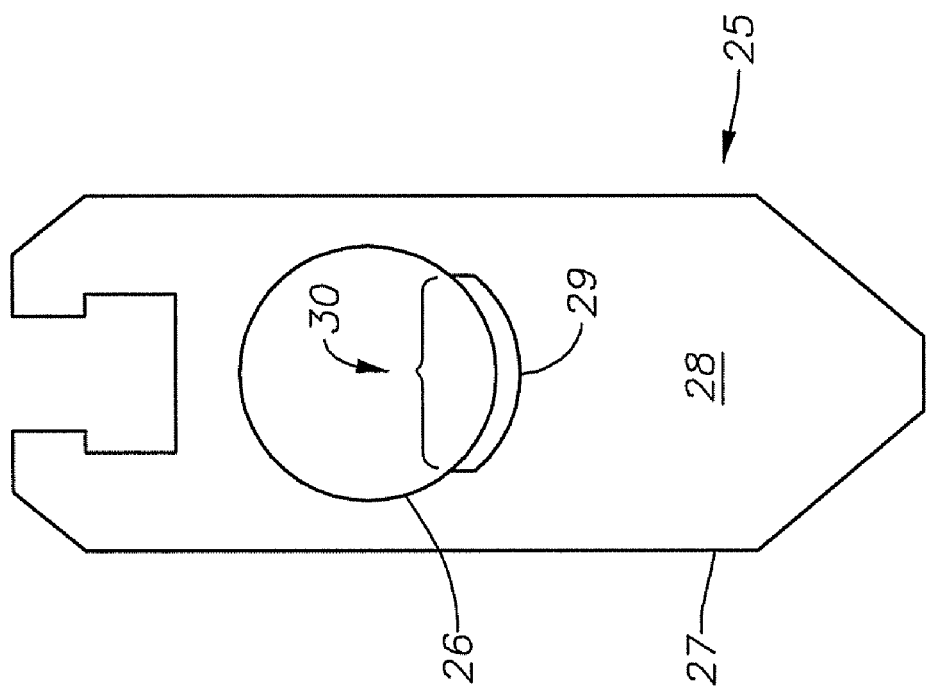
FIG. 2 is a top view of the gate of FIG. 1.

With reference now to FIG. 2, a side view of an embodiment of a gate 25 is shown. In this view, the recess 29 is shown formed on the valve face 28 and extending a distance from the opening 26 outer radius. In this embodiment, the recess 29 traverses a portion of the opening 26 circumference. A cutting edge 30 is illustrated as extending along a portion of the opening 26, shown in the example as extending about 60. The cutting edge 30 may coincide with the recess 29. Optionally, the cutting edge 30 can extend along a portion of or well past the recess 29, such as for example, up to the entire opening 26 circumference. As will be discussed in further detail below, closing the valve assembly 11 when a line is in the valve assembly 11 severs the line. The line is severed by forcedly impinging the line between the cutting edge 30 and passage 15 outer radius.

Figure 3:
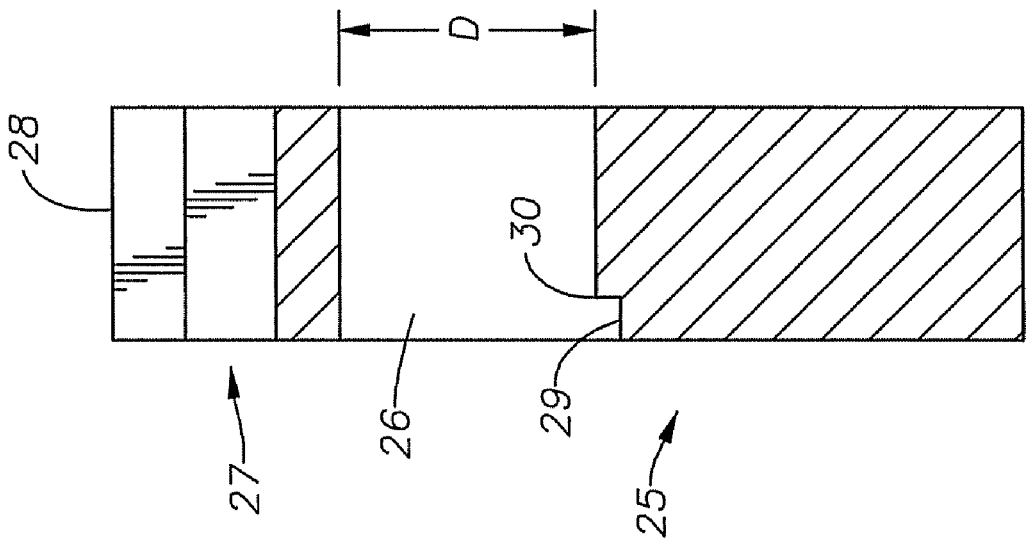
FIG. 3 is side section view of the gate of FIG. 1 along the line 3-3 of FIG. 2.

FIG. 3 illustrates an embodiment of the gate 25 in a side sectional view; the cutting edge 30 forms along a line where the recess 29 joins the opening 26 diameter (also see FIG. 2). Cutting edge 30 is recessed within opening 26, thus is spaced from face 28. In the embodiment of FIG. 3, the opening 26 diameter D is not affected or reduced in diameter by the presence of the cutting edge 30. Optionally, the cutting edge 30 may include a chamfer on its cutting surface. Wire or line cuttings may be detached from a member being severed with the cutting edge 30. The recess 29 adjacent the cutting edge 30 provides a space to receive any such cuttings instead of the cuttings becoming wedged between the valve face 28 and the valve seats 21. The recess 29 also provides clearance separating sealing surfaces from upwardly projecting wire shards formed during cutting. Thus an advantage of the recess 29 is preventing leakage between the valve face 28 and valve seats 21 from cutting debris.

Figure 4A:
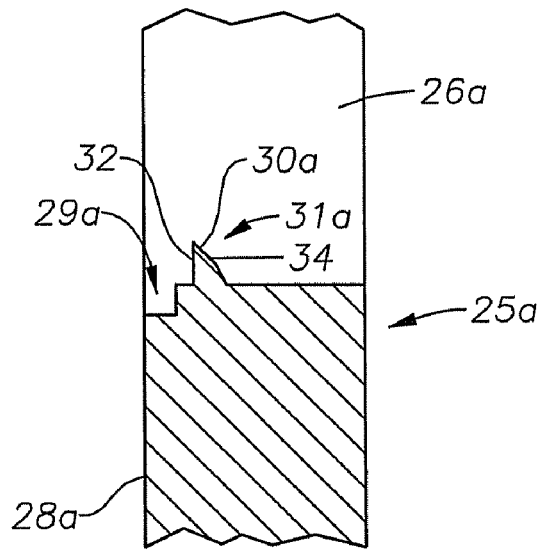
FIGS. 4a-4e depict in sectional view alternative embodiments of a gate cutting surface.

FIGS. 4a through 4e illustrate alternative cutting edge 30 embodiments in side sectional views. In FIG. 4a a cutting blade 31a projects into the opening 26a. As shown, the cutting blade 31a is set back from the recess 29a upper terminal end. Cutting blade 31a is not positioned directly adjacent to recess 29a, in this example; rather it is spaced farther from face 28a in the opening 26a. The cutting edge 30a is shown defined by a line where two surfaces 32, 34 meet. In this embodiment, the surfaces 32, 34 meet at roughly a 45° angle. Cutting blade 31a is thus recessed within opening 26a and projects into opening 26a. Cutting blade 31a is spaced from recess 29a thereby forming a ledge between the front surface 32 and the recess 29a.

Figure 4B:
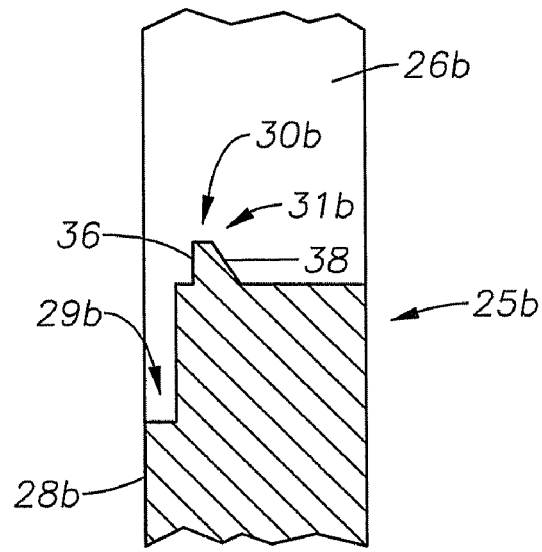

Optionally, as shown in FIG. 4b, a cutting blade 31b provides a cutting edge 30b that projects into opening 26b and is recessed from the face 28b. In FIG. 4b the cutting edge 30b is formed where two surfaces 36, 38 are joined at roughly a 90° angle. It should be pointed out, however, that the present scope includes embodiments having cutting edges of adjoining surfaces of less than 45° up to about 90°, and increments there between. Cutting blade 31b is spaced from recess 29b thereby forming a ledge between the front surface 36 and the recess 29b.

Figure 4C:
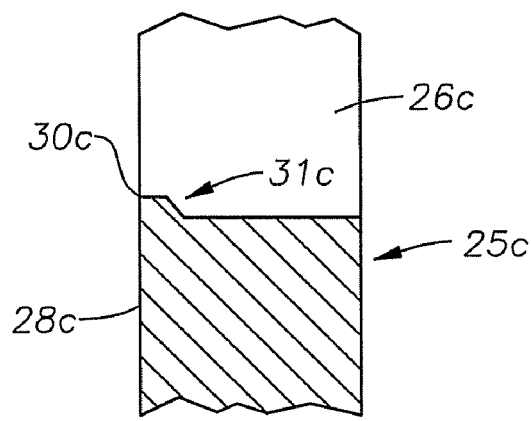

In FIG. 4c the cutting blade 31c is disposed in the same plane as the valve face 28c and projects into the opening 26c. Thus unlike the embodiments of FIGS. 4a, b, d, and e, the cutting blade 31c is slideable adjacent the valve 21 and separated from the valve seat 21 by a gap. The cutting blade 31c rearward side (distal from the valve face 28c) may be angled away from the valve face 28c to enhance cutting blade 31e stability. There is no recess adjacent cutting blade 31c.

Figure 4D:
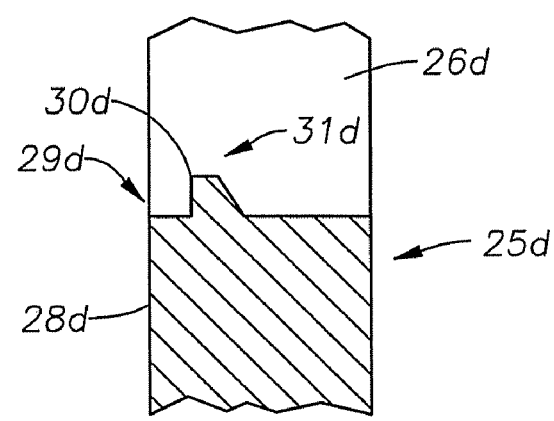

The gate 25d of FIG. 4d includes a cutting blade 31d projecting into the opening 26d. In this embodiment the cutting blade 31d is spaced from the valve face 28d to provide a recess 29d therebetween. The gate 25d does not include a recess similar to the recess 29 (FIG. 1).

Figure 4E:
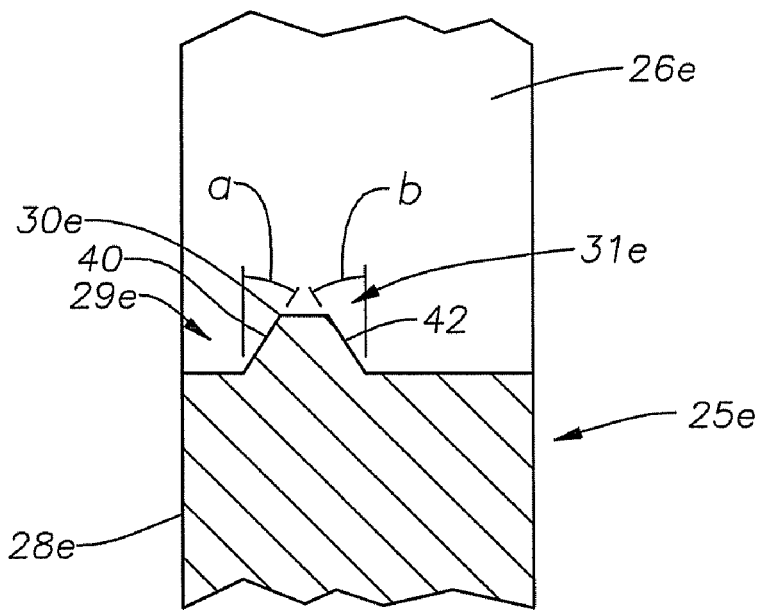

In FIG. 4e, a cutting blade 31e is illustrated also projecting into the opening 26e and spaced from the valve face 28e. The cutting blade 31e of FIG. 4e includes forward and rearward sides 40, 42 angled with respect to the valve face 28e and a recess 29e adjacent the forward side 40. The forward side 40 may be angled from about 5° to about 20°, as illustrated by angle a, and the rearward side 42 may be angled from about 20° to about 75°.

Optionally, the cutting surface on which the cutting edge 30 is mounted and gate 25 are integrally formed from a single workpiece into a uni-body element. Thus the cutting edge 30, and any cutting blades 31, may comprise the same material as the remaining portions of the gate 25. Alternatively, an insert defining the opening 26 inner circumference and cutting edge 30 may be formed separate from the solid portion 27. The insert may be made from the same or substantially the same material as the solid portion 27.

Figure 5:
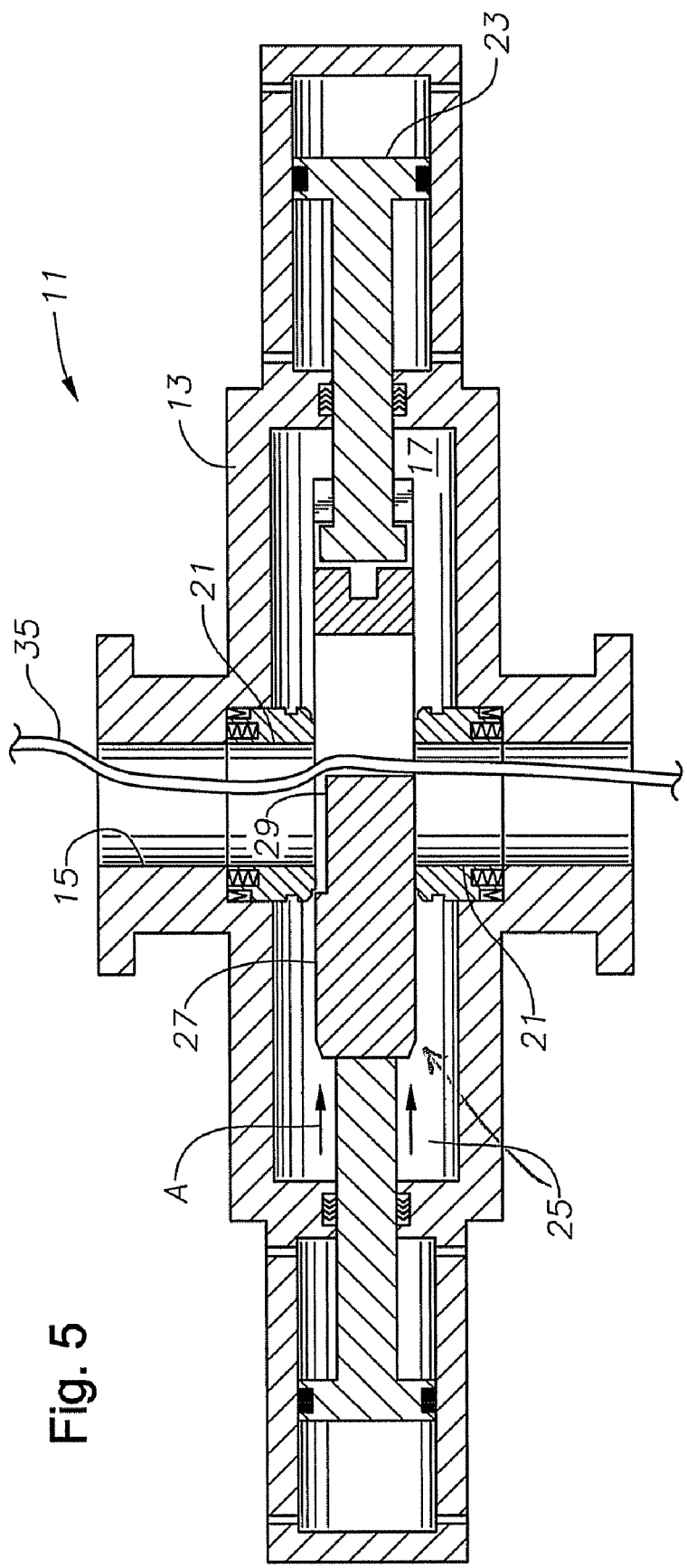
FIG. 5 is a sectional view a gate valve assembly having a gate in accordance with the present disclosure severing a line.

With reference now to FIG. 5, a side sectional view of the valve assembly 11 of FIG. 1 is shown in a cutting mode. Here the gate 25 is selectively moved in the direction of the arrow A impinging a line 35 between its cutting edge 30 and the passage 15 outer radius. Applying a cutting force to the gate 25 severs the line 35. Accordingly, any cuttings dislodged from the line 35 may be trapped in the recess 29 thereby preventing debris from contacting the valve seats 21 to ensure proper seating of the valve 11 when in the closed position. The line 35 may include a wireline, a slickline, or any elongated member extending through a gate valve.

A side schematic view of a wellhead assembly 37 disposed over a borehole 39 is provided in FIG. 6. The wellhead assembly 37 includes a wellhead housing 41, a production tree 43 over the housing 41 and flow lines 45 connected to the tree 43. The flow lines 45 include embodiments of valve assemblies 11 described herein. A line 35 is shown passing through a flow line 45, through a valve assembly 11 and into the borehole 39 via the wellhead assembly 37. The wellhead assembly 37 may be at surface or subsea.

In one example of use of the device described herein, line 35 passes through an embodiment of a valve assembly 11 while the valve assembly 11 is in an open or partially open position. A circumstance may arise requiring the valve assembly 11 be put into the closed position before the line 35 can be removed from the valve assembly 11. Referring to FIG. 5, a gate 25 of the valve assembly 11, having cutting edge 30, is then selectively moved from an open to a closed position. The gate 25 is closed with sufficient force to sever the line 35 when cutting edge 30 impinges it against the passage 15 outer diameter. Any cuttings created during severing the line 35 are collected in recess 29 provided on the gate 25. When in the closed position, the valve face 28 seals within a valve body 13, such as against valve seats 21, without cuttings trapped between the valve face 28 and the body 13 or valve seats 21.

While the invention has been shown in a single form, it should be apparent to those skilled in the art that it is not so limited but susceptible to various changes without departing from the scope of the invention. For example, embodiments of the gate 25 described herein having a cutting edge 30 formed on opposing sides of the opening 26.

The invention claimed is:

1. A gate valve comprising:
a valve body having a chamber;
a passage formed through the body intersecting and transverse to the chamber;
a gate having first and second substantially planar sides and an opening formed through the gate and through the sides, the gate being moveable within the chamber to selectively align the opening with the passage for flow through the valve, and
a cutting edge defined by a recess formed at an intersection of the opening and the first side of the gate and that extends up to a portion of the circumference of the opening.

2. The gate valve of claim 1, wherein the recess is defined by a flat surface parallel with the first side and located within the opening.

3. The gate valve of claim 1, wherein the cutting edge projects radially into the opening.

4. The gate valve of claim 3, the cutting edge defined by a line where two surfaces are joined, where the angle between the two surfaces is about 90°.

5. The gate valve of claim 4, the cutting edge defined by a line where two surfaces are joined, where the angle between the two surfaces is about 45°.

6. The gate valve of claim 1, wherein the recess extends around only a fractional portion of the circumference of the opening.

7. The gate valve of claim 1, further comprising an annular valve seat coaxially provided in the passage, the gate positioned to align the first and second surfaces with the passage, the portion of the intersection between the first side and the opening past the terminal end of the recess in sealing contact with the valve seat and the cutting edge being separated from the valve seat as the cutting edge passes the valve seat while the gate is being closed.

8. A gate valve comprising:
a body having a chamber therein;
a passage through the body intersecting the chamber;
a gate slideable within the chamber substantially transverse to the passage;
an opening in the gate selectively alignable with the passage;
the gate further having a recess extending up to partially around a junction of the opening and the first side of the gate and a cutting edge within the opening at an intersection of the recess and the opening.

9. The gate valve of claim 8, wherein the opening comprises a cylindrical bore and the cutting edge is flush with the wall surface of the bore.

10. The gate valve of claim 8, further comprising an annular valve seat coaxially provided in the passage, the gate positioned to align the first and second surfaces with the passage, the cutting edge being separated from the seal ring as the cutting edge passes the valve seat while the gate is being closed.

11. A gate valve assembly comprising:
a hollow body housing a chamber in the body;
a fluid flow passage passing through the body intersecting the chamber;
a substantially planar gate member having a first valve face and a second valve face on opposing planar sides, and a bore formed through the gate member between the first valve face to the second valve face;
a ledge located in the bore and extending around up to a portion of the bore perimeter, the ledge spaced from the first side a selected distance, the inner portion of the ledge defining a cutting edge.

12. The gate valve assembly of claim 11 further comprising a recess formed on the first side adjacent the ledge.

13. The gate valve assembly of claim 11, the ledge defining a cutting element having forward and rearward surfaces projecting from the bore outer diameter into the bore along lines substantially parallel to the valve face, and the forward surface proximate the ledge.

14. The gate valve assembly of claim 13, wherein the forward surface is oblique to the valve face.

15. The gate valve assembly of claim 14, wherein the forward surface is angled from about 5° to about 20° from the bore outer diameter.

16. The gate valve assembly of claim 14, wherein the rearward surface is angled from about 45° to about 90° from the bore outer diameter.

17. The gate valve assembly of claim 11, the gate valve coupled to a wellhead assembly.

* * * * *